(12) United States Patent
Milani

(10) Patent No.: US 11,465,442 B2
(45) Date of Patent: Oct. 11, 2022

(54) MULTI-POSITION CENTER CAP

(71) Applicant: Elite Wheel Warehouse, Tampa, FL (US)

(72) Inventor: Hamed Milani, Tampa, FL (US)

( * ) Notice: Subject to any disclaimer, the term of this patent is extended or adjusted under 35 U.S.C. 154(b) by 430 days.

(21) Appl. No.: 16/687,720

(22) Filed: Nov. 19, 2019

(65) Prior Publication Data

US 2021/0146720 A1 May 20, 2021

(51) Int. Cl.
| | |
|---|---|
| *B60B 7/06* | (2006.01) |
| *B60B 7/00* | (2006.01) |
| *B60B 7/08* | (2006.01) |
| *B60B 3/16* | (2006.01) |

(52) U.S. Cl.
CPC ............ *B60B 7/0013* (2013.01); *B60B 7/066* (2013.01); *B60B 7/08* (2013.01); *B60B 3/16* (2013.01)

(58) Field of Classification Search
CPC ......... B60B 3/16; B60B 7/0013; B60B 7/066; B60B 7/04; B60B 7/08
See application file for complete search history.

(56) References Cited

U.S. PATENT DOCUMENTS

| | | | | |
|---|---|---|---|---|
| 3,722,958 A * | 3/1973 | Marshall | ................... | B60B 7/20 301/37.38 |
| 5,845,972 A * | 12/1998 | Baker | ....................... | B60B 7/14 301/37.38 |
| 6,964,454 B1 * | 11/2005 | Miansian | .................. | B60B 7/20 301/37.41 |
| 8,632,135 B2 * | 1/2014 | Miansian | .................. | B60B 1/14 301/37.25 |
| 2005/0146204 A1 * | 7/2005 | Kim | ......................... | B60B 7/14 301/37.25 |
| 2014/0103701 A1 * | 4/2014 | Chung | ..................... | B60B 1/06 29/894.36 |
| 2014/0152079 A1 * | 6/2014 | Vickers | ..................... | B60B 7/06 301/37.102 |
| 2016/0229227 A1 * | 8/2016 | Luo | ........................ | B60B 7/0013 |
| 2018/0319209 A1 * | 11/2018 | Chung | ..................... | B60B 7/18 |

* cited by examiner

*Primary Examiner* — Scott A Browne
(74) *Attorney, Agent, or Firm* — Justin Luby

(57) ABSTRACT

The present disclosure pertains to a two piece center cap design which can be securably affixed to a wheel in a manner that does not require the center cap to be removed when installing and removing the wheels from a vehicle. This is achieved by rotating the center cap from a first position covering the lug nuts, to a second position, which does not cover the lug nuts, thereby providing access to the wheel lugs to allow the wheel to be installed and removed.

4 Claims, 8 Drawing Sheets

PRIOR ART

MULTI-POSITION CENTER CAP

CROSS-REFERENCE TO RELATED APPLICATIONS

Not Application

FIELD OF THE INVENTION

The present invention pertains to hubcaps for automobiles, and more particularly the center caps for the hubs of the wheels.

BACKGROUND

A center cap is a decorative disk on an automobile wheel that covers the center bore and parts of the center disc of the wheel. The center bore is the opening that allows the wheel to fit on the axle and attaches the wheel to the vehicle and bears the weight of the vehicle. The center disc is the portion of the wheel into which the bolt holes are machined to create the bolt circle. The center bore area is the point of contact to the axle seat, the lug bolts and the lateral surface of the rotor. Everything on the wheel connects in some manner to the center disc.

Early center caps for automobiles were small and primarily served the purpose of keeping dirt away from the spindle nut and wheel bearings of vehicles. Center caps found on new cars today are oftentimes decorative and also hide the lug nuts, in addition to the bearing.

Often a center cap will bear the logo or trademark of the maker of the automobile or the maker of the center cap, but there are custom center caps without any trademark as well.

Center caps are both metal and plastic, and are typically used with aluminum alloy or styled steel wheels. Some full wheel covers use removable center caps, typically those retained by lug nuts, with the center cap's purpose to hide the lug nuts that are securing the wheel to the vehicle's hub. Additionally, some vehicle owners prefer a hybrid look, where the center cap covers a portion of the lug nuts, while leaving a portion of the lug nuts exposed. This more prevalent on large wheels were a larger number of lug nuts (ten or more) are required to secure the wheel to the vehicle.

Center caps are oftentimes retained to the wheel using resistance means, such as spring clips, while others are retained by the wheel lugs or other threaded fasteners. Center caps which cover wheel lugs and are retained by resistance means, must be removed from the face of the wheel to remove the lugs and remove the wheel from the vehicle. This can be problematic as typically the resistive means of retaining the center cap to the wheel are oftentimes deformed during the installation and removal process. This deformation can limit the lifespan of the center cap, as after a number of times being installed and removed, the center cap will be deformed to the point is can no loner be secured to the wheel.

What is needed is a center cap which covers the wheel lugs, but does not require the center cap to be removed from the wheel to remove the lug nuts when installing and removing the wheels from a vehicle.

SUMMARY

The present disclosure pertains to a two piece center cap design which can be securably affixed to a wheel in a manner that does not require the center cap to be removed when installing and removing the wheels from a vehicle by rotating from a first position covering the lug nuts, to a second position, which does not cover the lug nuts, thereby providing access to the wheel lugs to allow the wheel to be installed and removed.

The center cap is comprised of primarily two pieces, an interior wheel attachment member and an exterior lug cover. The interior wheel attachment member is affixed to the central portion of the wheel and the exterior lug cover affixes to the interior wheel attachment member. The exterior lug cover and interior wheel attachment member are connected to each other in a manner such that the exterior lug cover can rotate around the stationary interior wheel attachment member.

The exterior lug cover comprises spokes which extend from the center of the exterior lug cover and extend out past the lug nuts. The number of spokes is half of the number of lug nuts on the wheel (e.g. a wheel with ten lug nuts would utilize a canter cover with five spokes). When installed the exterior lug cover will cover half of the lug nuts on the wheel, while leaving half of the lug nuts exposed.

The center cap has two position stops which retain the exterior lug cover in the first and second positions. The stops retain the exterior lug cover in the preferred locations so that the exterior lug cover spokes cover the desired lugs and prevents the exterior lug cover from freely rotating while the vehicle is in motion.

When installing or removing the wheel from the vehicle, the exterior lug cover will be in the first position, covering the first half of the lug nuts. The exposed first half if the lug nuts can be removed or installed. Once the first half of the lug nuts have been removed or installed the exterior lug cover rotates to the second position, where the second half of the lug nuts are exposed and can be removed or installed.

DETAILED DESCRIPTION OF THE INVENTION

Figure 1:
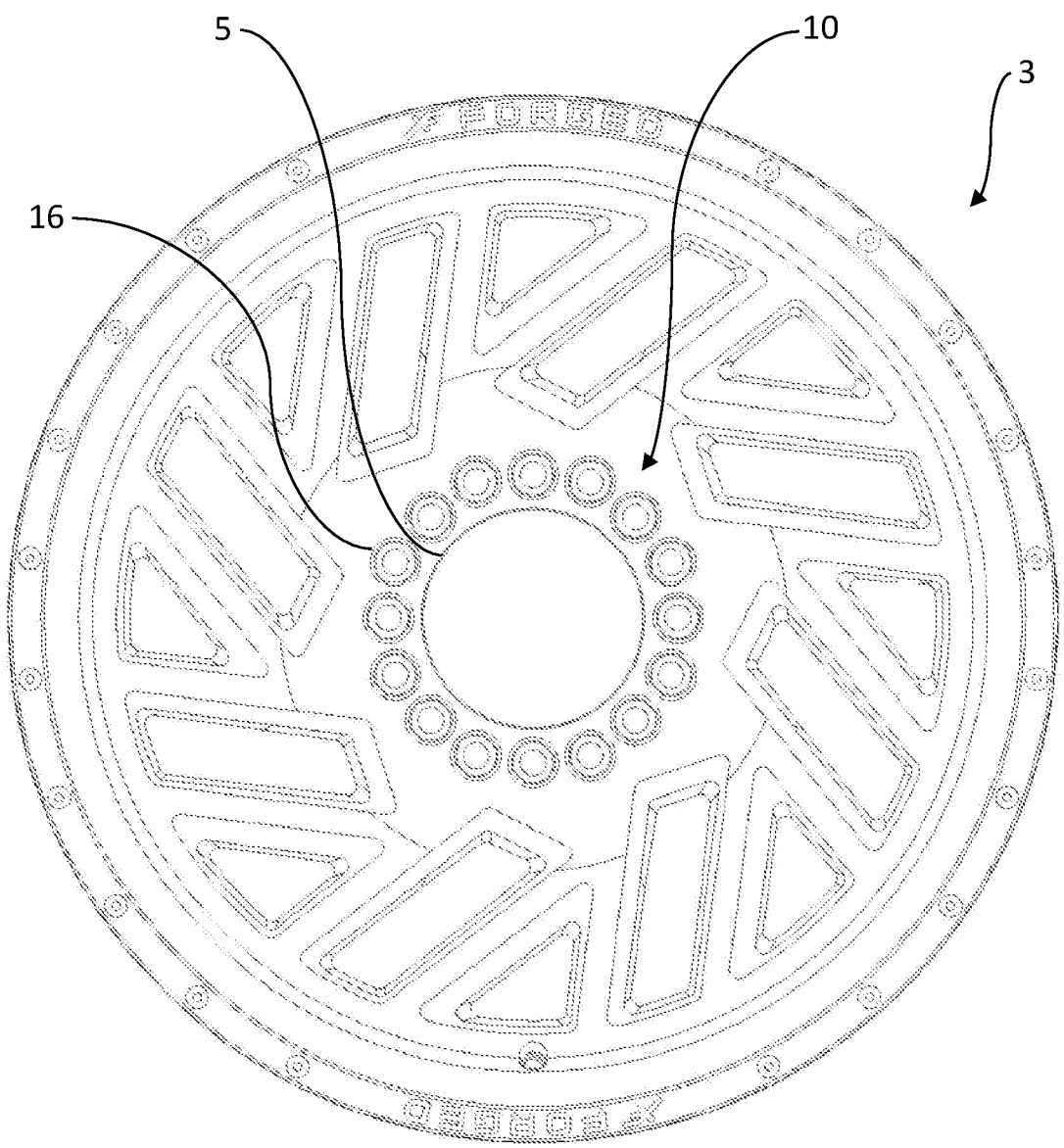
FIG. 1 illustrates a front view drawing of a prior art wheel, without a center cap installed.
Figure 2:
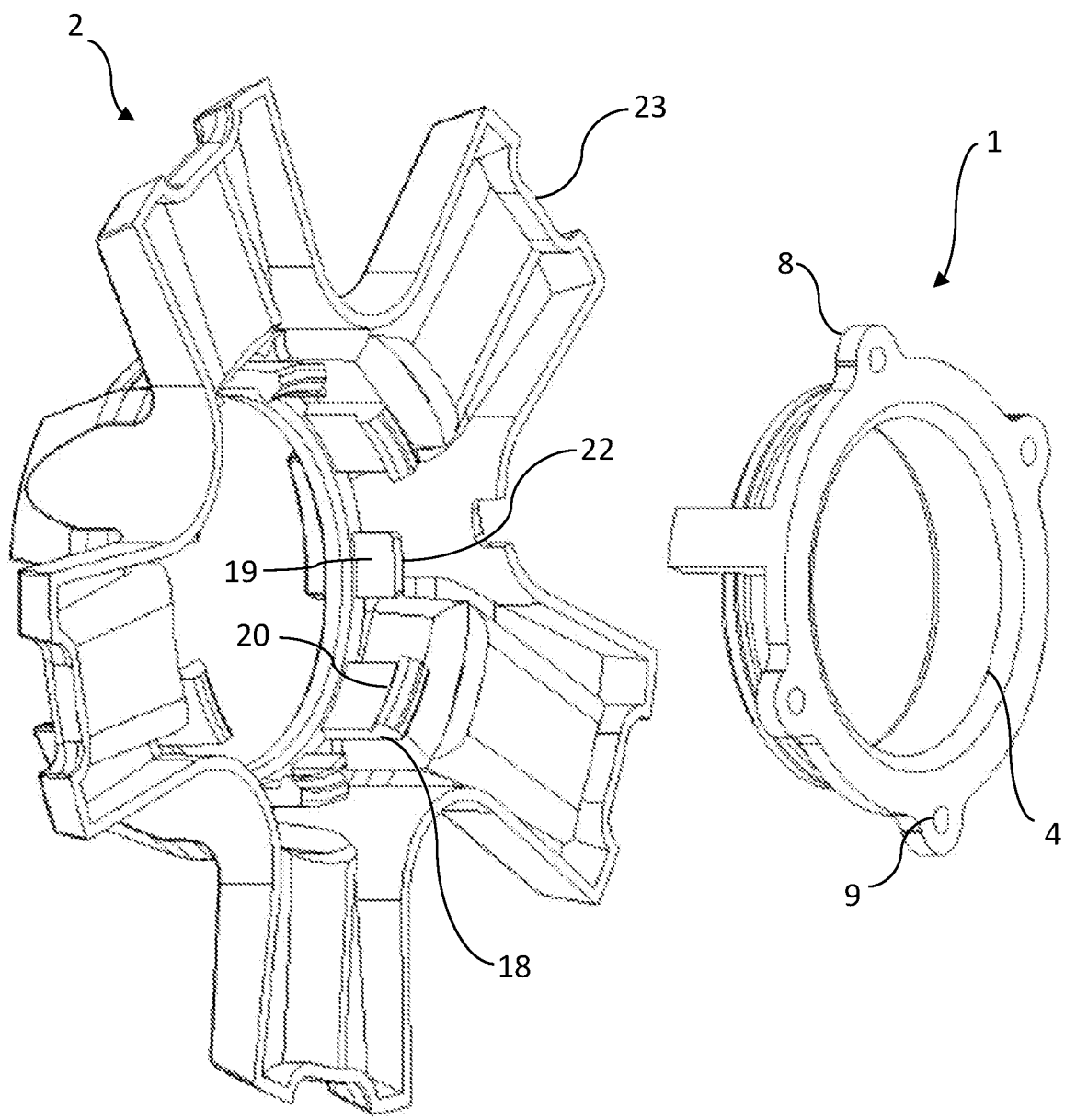
FIG. 2 illustrates an exploded rear perspective view drawing of the first embodiment of the of the center cap current invention with 5 spokes.
Figure 3:
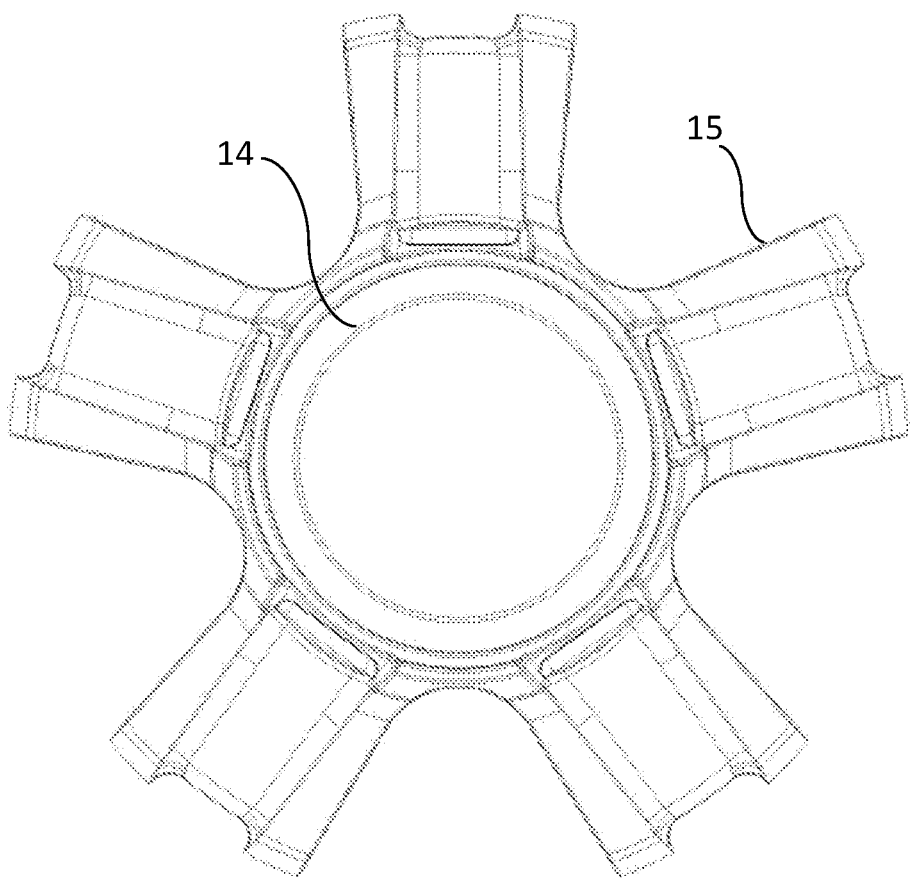
FIG. 3 illustrates a top view drawing of the first embodiment of the of the center cap current invention with 5 spokes.
Figure 4:
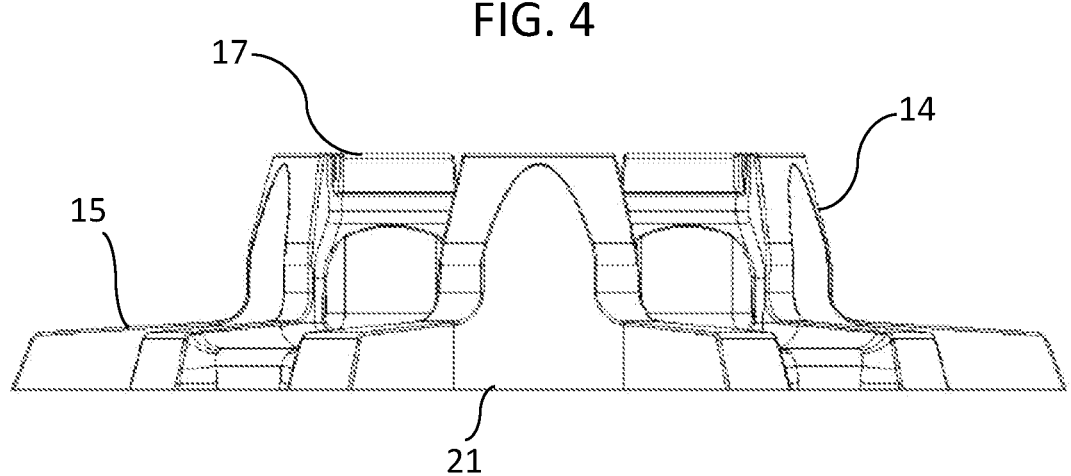
FIG. 4 illustrates a side view drawing of the first embodiment of the of the center cap current invention with 5 spokes.
Figure 5:
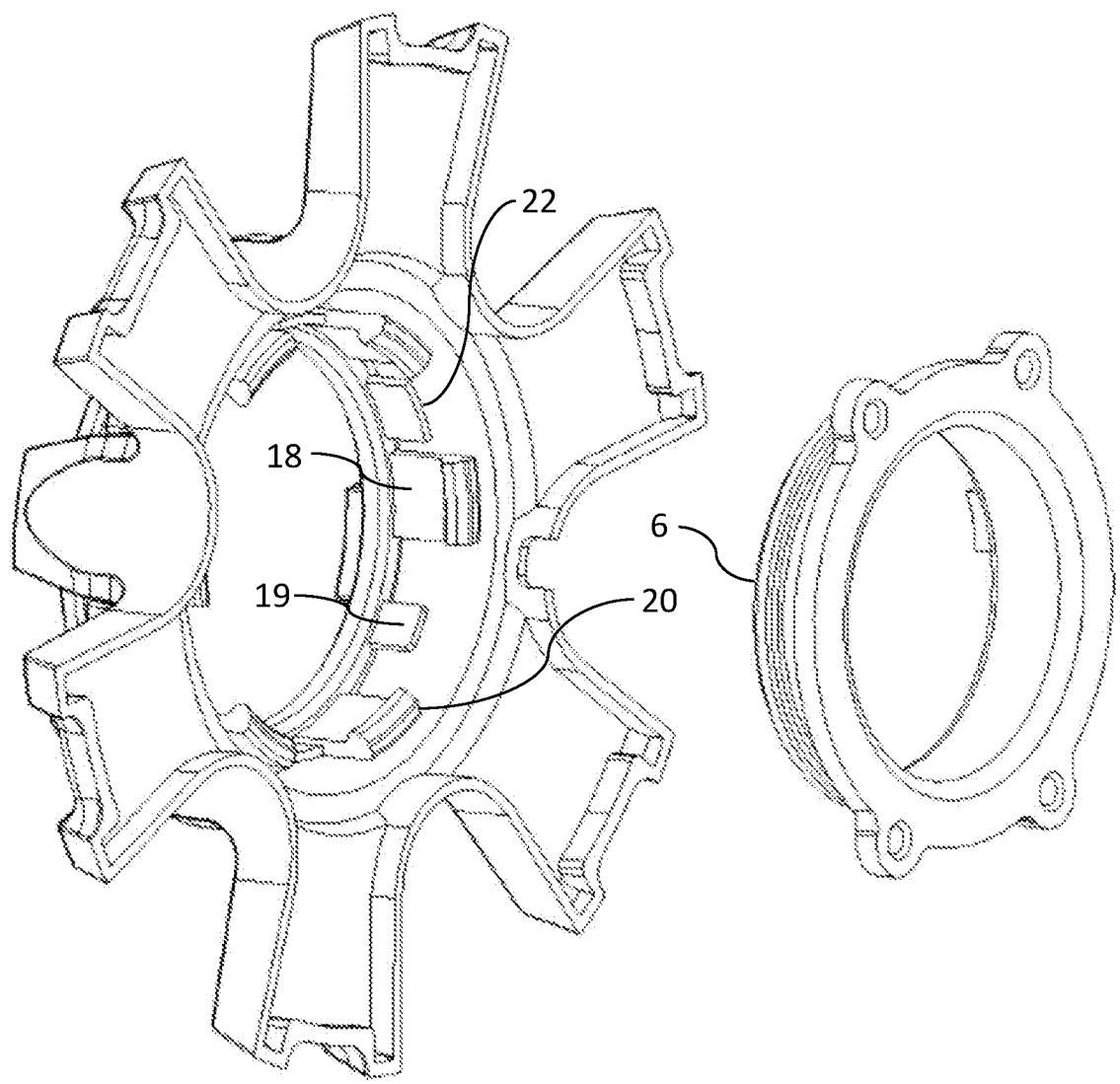
FIG. 5 illustrates an exploded rear perspective view drawing of the second embodiment of the of the center cap current invention with 6 spokes.
Figure 6:
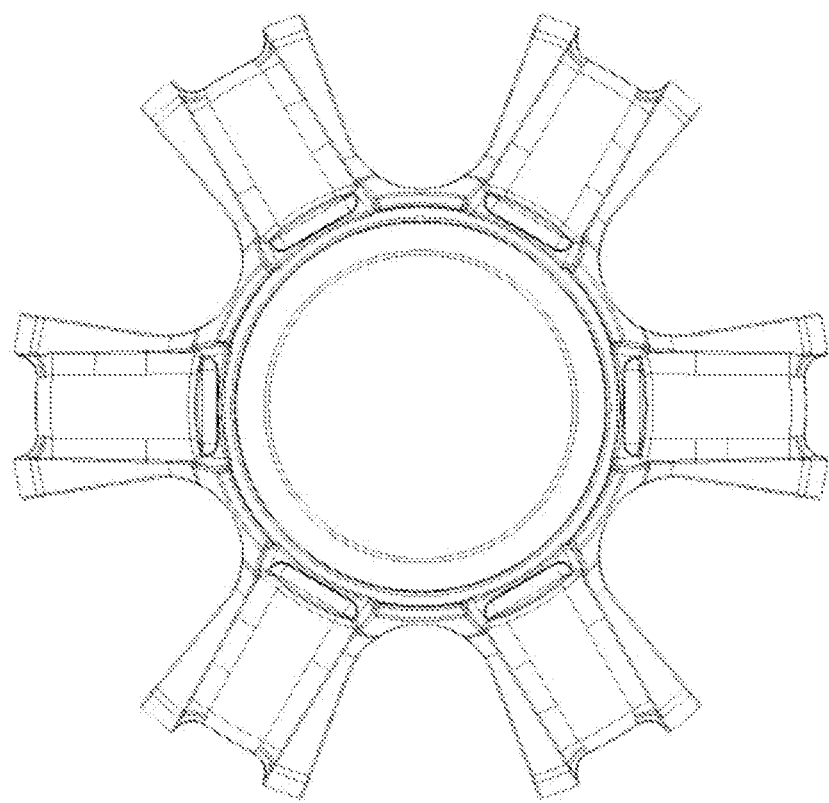
FIG. 6 illustrates a top view drawing of the second embodiment of the of the center cap current invention with 6 spokes.
Figure 7:
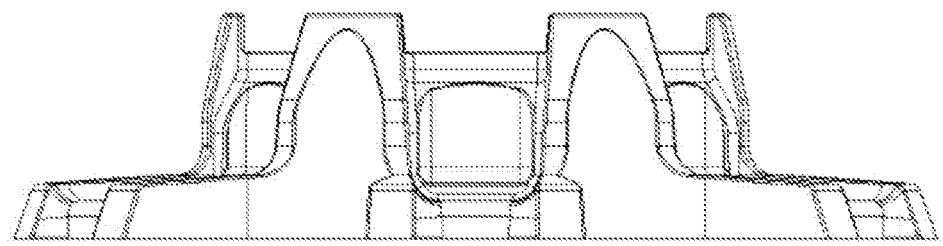
FIG. 7 illustrates a side view drawing of the second embodiment of the of the center cap current invention with 6 spokes.
Figure 8:
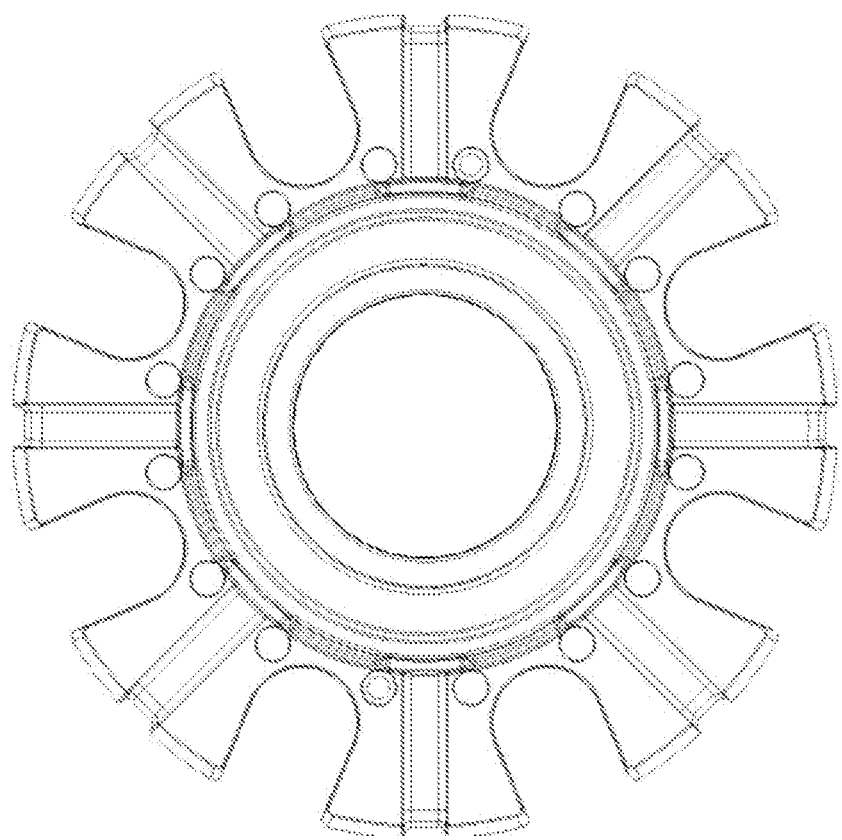
FIG. 8 illustrates a top view drawing of the third embodiment of the of the center cap current invention with 8 spokes.
Figure 9:
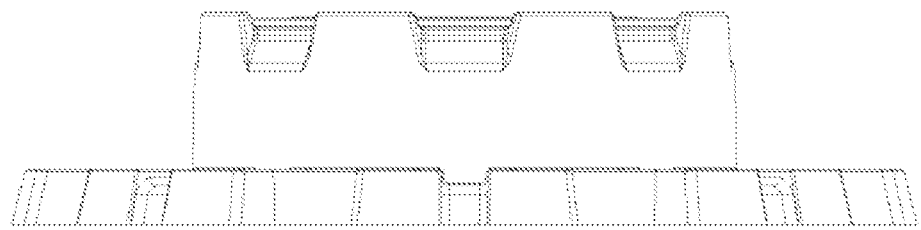
FIG. 9 illustrates a side view drawing of the third embodiment of the of the center cap current invention with 8 spokes.
Figure 10:
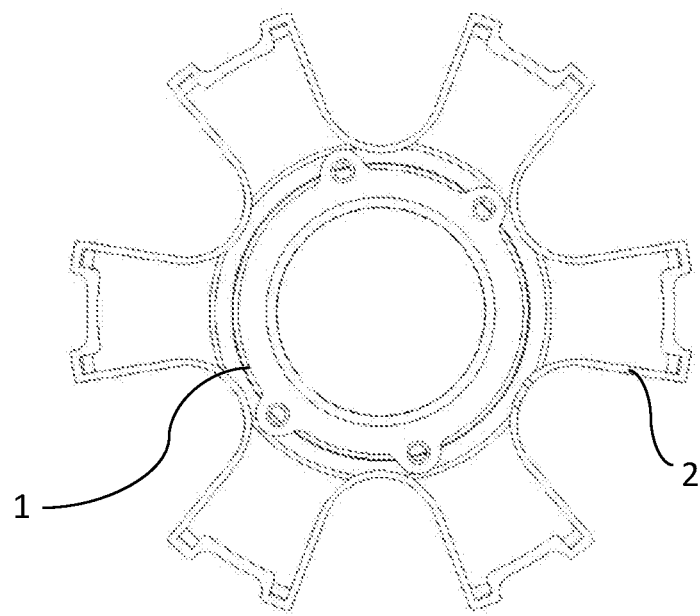
FIG. 10 illustrates a bottom view drawing of the second embodiment of the of the center cap current invention with 6 spokes.
Figure 11:
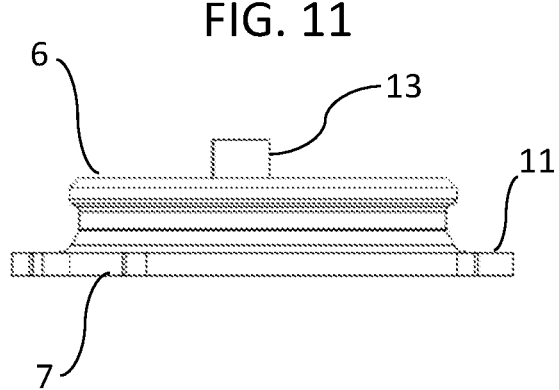
FIG. 11 illustrates a first side view drawing of the interior wheel attachment member.
Figure 12:
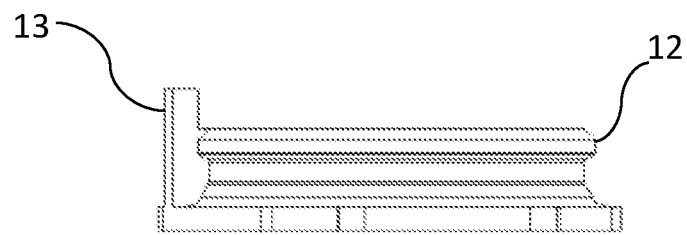
FIG. 12 illustrates a second side view drawing of the interior wheel attachment member.
Figure 13:
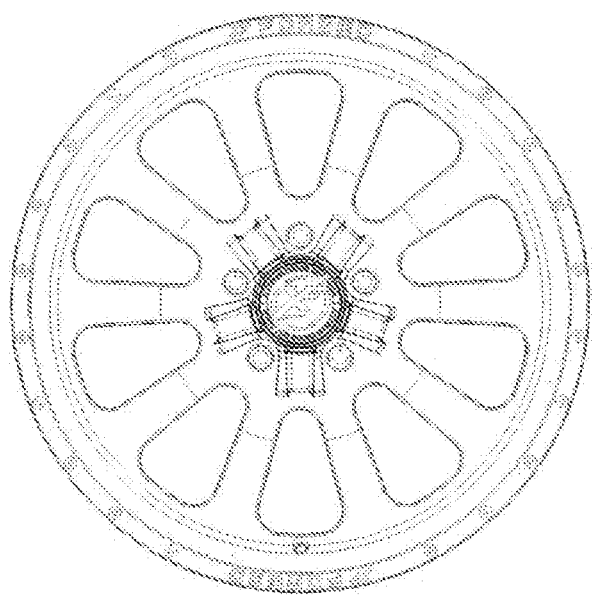
FIG. 13 illustrates front view drawing depicting the first embodiment of the center cap mounted on a wheel in the first position.
Figure 14:
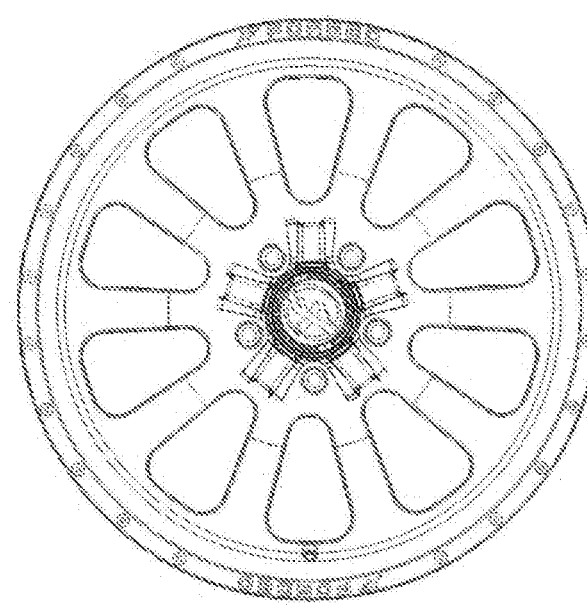
FIG. 14 illustrates front view drawing depicting the first embodiment of the center cap mounted on a wheel in the second position.

The present invention provides a center cap for mounting on a wheel 3. FIGS. 1-3 depict a first embodiment of the center cap, FIGS. 4-6 depict a second embodiment of the center cap, and FIGS. 7-8 depict a third embodiment of the center cap.

The center cap is comprised of primarily two pieces, an interior wheel attachment member 1 and an exterior lug cover 2. The interior wheel attachment member 2 is affixed to the central portion of the wheel 3 and the exterior lug cover 2 affixes to the interior wheel attachment member 1. The exterior lug cover 2 and interior wheel attachment member 1 are connected to each other in a manner such that the exterior lug cover 2 can rotate around the stationary interior wheel attachment member 1.

The interior wheel attachment member 1 is a hollow cylindrical shape where the inner diameter 4 of the wheel attachment piece 1 is roughly the same diameter as the center bore 5 of the wheel hub 10. The interior wheel attachment member 1 has a top side 6 and a bottom side 7. The exterior lug cover 2 connects to the top side 6 of the interior wheel attachment member 1. The bottom side 7 of the interior wheel attachment member 1 attaches to the wheel 3.

The bottom side 7 of the interior wheel attachment member 1 has a plurality of tabs 8 attached to the outer diameter of the interior wheel attachment member 1. Each of the tabs 8 has a center hole 9 in the tab 8. The wheel hub 10 has threaded fastener thread receptacles (not depicted) in the same pattern as the tabs 8. The interior wheel attachment member 1 is attached to the wheel hub 10 by fasteners (not depicted), which are oriented such that the head of the fastener is on the top side 11 of the tabs 8 and the fastener threads travel through the tab hole 9 and are threaded into the wheel hub threaded fastener thread receptacles.

While the preferred embodiment of the invention utilizes fasteners to secure the interior wheel attachment member 1 to the wheel hub 10, there are a number of alternative methods to achieve this, that would be known to those skilled in the art, including, but not limited to, welding and adhesives.

The top side 6 of the interior wheel attachment member 1 has a raised semi-circular ridge 12 that runs along the outer diameter of the hollow cylindrical shape of the interior wheel attachment member 1. The raised semi-circular ridge 12 provides a connection location for the exterior lug cover 2 that will create a rotatable annular snap-fit joint with the exterior lug cover 2.

The interior wheel attachment member 1 also has a stop 13 which protrudes upwards from the bottom side 7 of the interior wheel attachment member 1 towards the top side 6 of the interior wheel attachment member 1. The stop 13 will be utilized to limit rotation of the rotatable annular snap-fit joint.

The exterior lug cover 2 comprises a center bore cover hub 14 and a plurality of spokes 15 which protrude outward from the center bore cover hub 14 and are equally spaced. In the preferred embodiment, the number of spokes 15 is one-half the number of lugs 16 used to connect the wheel 3 to the hub of the vehicle (not depicted). While in the preferred embodiment the number of spokes 15 is one-half the number of lug holes 16 used to connect the wheel 3 to the hub, there could be and number of spokes 15, including the same number of lug holes 16 used to connect the wheel 3 to the hub.

The center bore cover hub 14 is generally a hollow cylindrical shape with a top 17, but no bottom, which is ornamentally designed to be visually appealing. Inside the center bore cover hub 14 are a plurality of long tabs 18 and short tabs 19 which protrude downward from the top 17 of the center bore cover hub 14. The long tabs 18 and short tabs 19 are semi-circular shaped the diameter of the tabs which match the top side 6 of the interior wheel attachment member 1.

The long tabs 18 have a semi-circular ridge 20 that runs along the bottom edge and inner diameter of the long tabs 18. The raised semi-circular ridge 20 provides a connection location for the exterior lug cover 2 that will create a rotatable annular snap-fit joint with the exterior lug cover 2. In addition to providing an annular snap-fit joint the long tabs 18 also serve as a upper depth guide, which once the snap-fit joint maintains the maximum distance between the underside 21 of the exterior lug cover 2 and the wheel 3. The length of the long tabs 18 should create a gap between the underside 21 of the exterior lug cover 2 and the wheel 3 which does not exceed one-quarter (¼) inch. Also, the long tabs 18 serve the function of engaging with the interior wheel attachment member 1 stop 13 to position and secure the spokes 15 over the lug holes 16.

The short tabs 19 have a flat bottom edge 22 that rest on the top side 6 of the interior wheel attachment member 1. The short tabs 19 function to maintain the minimum distance between the underside 21 of the exterior lug cover 2 and the wheel 3 so that the exterior lug cover 2 and the wheel 3 to not touch. The length of the short tabs 19 should create a gap between the underside 21 of the exterior lug cover 2 so that the exterior lug cover 2 does not scratch the surface of the wheel 3 when it rotates.

The spokes 15 protrude outward from the center bore hub cover 14. The minimum width of the spokes 15 is such that spoke meet or exceed the outer diameter of the lug holes 16. The minimum length of the spoke 15 is such that the outer edge 23 of the spoke 15 protrudes beyond the lug holes 16. The minimum width and length of the spokes 15 ensure that when the spoke 15 is positioned over a lug hole 16, it covers the entire lug hole 16, hiding it from view.

To install the center cap of the current invention, the interior wheel attachment member 1 is attached to the wheel 3 using the tabs 8 and fasteners. Prior to fastening the interior wheel attachment member 1 to the wheel 3 the interior wheel attachment member 1 needs to be aligned with the wheel 3 such that the inner diameter 4 of the wheel attachment piece is aligned with the center bore 5 of the wheel 3. Additionally, the stop 13 should be aligned so that when one of the long tabs 18 engages with stop 13 to position the spokes 15 such that the spokes 15 are positioned over the lug holes 16.

After the interior wheel attachment member 1 is aligned and engaged with the wheel 3 the exterior lug cover 2 is affixed to the interior wheel attachment member 1 by pressing the center bore cover hub 14 onto the top side 6 of the interior wheel attachment member 1 so that the raised semi-circular ridge 20 of the long tabs 18 snaps over the raised semi-circular ridge 12 that runs along the outer diameter of the top side 6 of the interior wheel attachment member 1. Engaging the long tabs 18 and the top side 6 of the interior wheel attachment member 1 creates the snap-fit joint between the interior wheel attachment member 1 and the exterior lug cover 2.

After the interior wheel attachment member 1 and the exterior lug cover 2 are engaged the exterior lug cover 2 is clockwise rotated to a first position, which aligns the spokes 15 over a first set of lug holes 16. In the preferred embodiment at this first position a one of the long tabs 18 engages with the stop 13 to prevent further the rotation of the exterior lug cover 2. In the preferred embodiment of the invention, a first long tab 18 engages with the stop 13 through a friction fit that once engaged will prevent free rotation of the exterior lug cover 2 that can only be overcome by a rotational force.

To align the exterior lug cover 2 to a second position, which aligns the spokes 15 over a second set of lug holes 16, a rotational force is applied to the exterior lug cover 2 in the counter clockwise direction, which will disengage the first long tab 18 with the stop 13. The counterclockwise rotational force is continued to be applied to the exterior lug cover 2 until a second long tab 18 engages with the stop 13, securing the exterior lug cover 2 in the second position.

In the preferred embodiment, the exterior lug cover 2 has a number of spokes 15, which are equally spaced, that is equal to one-half the number of lugs 16. In the first position, the spokes 15 will cover a first half of the wheel lug holes 16, and in the second position, the spokes 15 will cover the second half of the wheel lug holes 16. When the first half of the wheel lug holes 16 are exposed, the lug holes 16 can be installed or uninstalled, then the exterior lug cover 2 can be rotated to the second position allowing the second half of the lug holes 16 to be installed or uninstalled.

While the preferred embodiment utilizes a frictional fit between the long tabs 18 and the stop 13, the function of securing the aligning the spokes 15 over the lug holes 16 and preventing free rotation of the exterior lug cover 2 can be achieved in alternate embodiments known by those skilled in the art in lieu of a frictional fit, such as the use of magnets or set screws.

While the preferred embodiment utilizes a rotatable annular snap-fit to create a rotatable connection between the interior wheel attachment member 1 and the exterior lug cover 2, there are alternate embodiments to achieve this same function. In a first alternate embodiment, a ball bearing could be attached to the center of either the interior wheel attachment member or the exterior lug cover, and a fastener could be attached to the center of the corresponding interior wheel attachment member or exterior lug cover. The fastener would securely affix the corresponding interior wheel attachment member or exterior lug cover to the interior wheel attachment member or exterior lug cover with the ball bearing affixed. The ball bearing would then create a freely rotating join equivalent to the annular snap-fit of the preferred embodiment of the current invention.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A wheel for an automobile comprising;
    a wheel comprising a center bore and a plurality of bolt holes creating a bolt circle;
    a center cap comprising an interior wheel attachment member, an exterior lug cover, and a positioning mechanism;
    said interior wheel attachment member comprising a top and a bottom, wherein the interior wheel attachment member is centered on the center bore and affixed to the wheel at the bottom of the interior wheel attachment member wherein the interior wheel attachment member comprises a first mating attachment member;
    said exterior lug cover comprising a center bore cover and a plurality of spokes to rotate around the interior wheel attachment member protruding outwardly a length from the center bore cover, wherein the center bore cover comprises a second mating attachment member and the length of the spokes minimally extends beyond the bolt circle;
    wherein the first mating attachment member and second mating attachment member are connected to create a rotating joint allowing the exterior lug cover to rotate around the interior wheel attachment member;
    wherein the positioning mechanism comprises a first tab that stops rotation of the exterior lug cover around the interior wheel attachment member at a first position where the plurality of spokes covers a first number of bolt holes and the positioning mechanism comprises a second tab that stops rotation of the exterior lug cover around the interior wheel attachment member at a second position where the plurality of spokes exposes a second number of bolt holes.

2. The wheel of claim 1 wherein the first mating attachment member comprises a raised semi-circular ridge along the top of the interior wheel attachment member and the second mating attachment member comprises the first and second tabs with a raised semi-circular ridge inside of the center bore cover wherein the second mating attachment member is pressed over the first mating attachment member to create an annular snap fit joint.

3. A wheel for an automobile comprising;
    a wheel comprising a hub and a number of bolt holes are creating a bolt circle;
    a center cap comprising an interior wheel attachment member affixed to the wheel hub, an exterior lug cover with a number of spokes protruding outwardly, and a rotating mechanism that secures the exterior lug cover to the interior wheel attachment member and allows the exterior lug cover to rotate around the interior wheel attachment member, and a positioning mechanism;
    wherein the positioning mechanism comprises a first tab that stops rotation of the exterior lug cover around the interior wheel attachment member at a first position and the positioning mechanism comprises a second tab that stops rotation of the exterior lug cover around the interior wheel attachment member a second position.

4. The wheel of claim 3 wherein the number of spokes is equal to one half the number of bolt holes, and when the exterior lug cover is in the first position the spokes cover a first half of the number of bolt holes and when the exterior lug cover is in the second position the spokes cover a second half of the number of bolt holes.

* * * * *